United States Patent [19]
Nausbaum

[11] 3,812,748
[45] May 28, 1974

[54] GLASS CUTTING DEVICE

[75] Inventor: Irving Nausbaum, New York, N.Y.

[73] Assignee: New Age Mirror and Tile Industries, Inc., Newark, N.J.

[22] Filed: Oct. 17, 1972

[21] Appl. No.: 298,227

[52] U.S. Cl. .............................. 83/12, 30/164.95
[51] Int. Cl. ............................................ B26d 3/08
[58] Field of Search .................. 83/12, 11, 10, 7, 6; 30/164.95; 33/32 G–32 R

[56] References Cited
UNITED STATES PATENTS

| | | | |
|---|---|---|---|
| 1,495,523 | 5/1924 | MacLean | 33/32 B |
| 1,750,913 | 3/1930 | Vollm | 225/96.5 |
| 1,753,191 | 4/1930 | Armstrong | 33/32 B |
| 2,090,183 | 8/1937 | Capstick | 33/32 B |
| 3,286,351 | 11/1966 | MacAlister | 33/32 B |

*Primary Examiner*—J. M. Meister
*Attorney, Agent, or Firm*—Omri M. Behr

[57] ABSTRACT

A device for cutting glass which can cut a sheet of glass of indeterminate length has a central bridge member with a channel formed therein. It has one or two outwardly extending arms which may be perpendicular to the bridge member. A glass cutter wheel is interlockable with the central bridge member channel through a cutting support member. The bridge member has distance markings inscribed on it. The cutter support member is adapted to be engaged by a pointer member which will indicate glass cutter position in respect to the bridge member.

6 Claims, 4 Drawing Figures

GLASS CUTTING DEVICE

BACKGROUND OF THE INVENTION

This invention relates to a glass cutting device for cutting sheets of glass of indeterminate lengths.

Glass is an amorphous non-crystaline material having very high compressive and shear strength. The compressive strength of glass ranges from 90,000 to 180,000 pounds per square inch. Steels range from 65,000 to 150,000 pounds per square inch compressive strength. In tensile strength glass has a range of from 4,000 to 1,500,000 pounds per square inch. Steel's tensile strength range is from 65,000 to 150,000 pounds per square inch.

The tensile strength of glass is highly dependent on the surface condition of the specimen. In practice, the tensile strength of glass tends toward the lower value because of the normal presence of surface imperfections.

Young's modulus for glass averages about 6,500,000 pounds per square inch. Young's modulus for aluminum is about 10,000,000 and for steel about 24,000,000 pounds per square inch. These values of Young's modulus show that glass is strong even compared to aluminum and steel. Similarly, Poisson's ratio for glass may equal Poisson's ratio for many steels.

It is well known that glass is substantially perfectly elastic up to the point of fracture. Further, it is well known that glass which fails does so from tensile stress and almost never from compression or shear stress.

These facts mean that to cut glass a fault must be created to enable the application of a tensile load to the remaining glass material. Because of the great strength, elasticity and hardness of glass, the creation of the cut or fault can be quite difficult.

Those skilled in the art know how difficult it is to apply a sufficiently heavy load to score glass for cutting along a line because of the elasticity and strength of glass. Unless the scoring or cutting force is applied perpendicularly to the glass, both the glass and the force bearing member may deflect sufficiently to prevent the scoring of the glass. The relatively low friction ratio between the glass and the cutting tool tend to exaggerate the cutting difficulties because the cutting tool tends to roll rather than cut, and it tends to roll out from under the pressure applied.

Glass Cutters are well known in the art. Typical of the prior art are the U.S. Pat. Nos. 3,439,426, issued to R.E. Wilson; U.S. Pat. No. 3,370,767 issued to H.I. Barrett; U.S. Pat. No. 2,814,163 issued to L.S. Krulwich and U.S. Pat. No. 1,697,044 issued to J. Burda.

All the above cited patents teach one common type of glass cutter in which the cutting device is held rigidly in a frame and the length of the scribe or cut is limited by the length of the frame. In all the above patents except the one to Burda, a cutting device is moving perpendicularly to the edge of the glass being cut. This requires that at least two edges of the plate of glass be straight or that the non guiding edge be a predetermined shape which is desirable. This constraint produces an additional limitation on the flexibility of such cutters.

In Burda, the base portion is apparently simply on the glass and no indication is shown as to how the base or the cutter which is fixed to the base is to be guided. Apparently the base is simply pressed onto the glass and the steadiness of the operator is deemed to be sufficient to insure that the cutter travels in a straight line. Obviously that has serious limitations.

Further, Burda requires an operator to control the direction and the angle of the applied pressure.

Other prior art cutting devices are typified by U.S. Pat. Nos. 3,407,498 issued to W. A. Young and U.S. Pat. No. 2,098,641 issued J. E. Cook and U.S. Pat. No. 1,578,477 issued N. Smith et al.. These devices teach cutters which are cutting in a plane parallel to the edge guide device. But importantly none of these devices have been applied to the glass cutting art. That failure is no accident. The Young device is used for cutting linoleum, the Cook device for cutting carpet, the Smith device for cutting sheet rock.

In each case the material to be cut is compared to glass relatively soft and with a relatively high coefficient of friction in conjunction with a steel blade.

In Young there is taught the device which the blade extends fully through the material to be cut. Obviously, such a system does not work in glass cutting. Further Young teaches a device in which the measuring surface is not the material to be cut but another.

In Cook the blade is held at an angle other than the vertical. It is enabled to cut through the material, and pressure is applied directly to the blade and to a pressure foot device which functions to keep the soft material pressed flat thus the blade will not wrinkle it.

In Smith a cutter is located outside of the handle portion which receives the pressure in a downward direction. The cutter is not protected from rotation about the center of pressure. In the Smith device this difference is of no significance because it is simply cutting through the paper cover of sheet rock. But in a device such as taught by the present invention it is important that the pressure be directly above the cutter and that there be no real possibility of rotation of the cutting mechanism.

It can be easily seen from the review of the prior art that there were problems to be solved. Prior art taught glass cutters in which cuts of finite dimension only could be made. This was because it was believed necessary to have a control system ample for the cutting device which ran perpendicular to the edge surface for guidance. In the prior art cutters for other materials they were shown cutters which could in theory operate on materials of indeterminate length. But all the cutters either cut entirely through the material or cut through materials of much less hardness and much higher coefficients of friction than glass. As a result these mechanisms were not adaptable or suitable for glass cutting.

SUMMARY OF THE INVENTION

The present invention solved the problems above and other problems in the prior art in a very simple and unique manner. That solution requires only a few very simple parts. Those parts are a central bridge member with a slot designed to engage a cutter holder member in such a manner that it cannot rotate in any direction about the central bridge member. One or two outwardly extending arms may be fixed to the bridge member and extend in the same direction as the cutter support member or blade is fixed to the cutter support member. One of the outward extending arms guides along an edge of the glass to be cut.

For ease of use the bridge member is inscribed with markings and the cutter member is fixed to a marking device attached thereto.

It is an object of the present invention to provide a novel simple design for a glass cutter capable of cutting glass material of indeterminate length.

It is an object of the present invention to provide a novel design for a glass cutter which holds the cutter member substantially vertically and transfers essentially all pressure placed in the cutter to the glass.

It is an object of the present invention to enable glass to be cut in either a horizontal or vertical direction.

It is an object of the present invention to provide a novel device for cutting an amorphous non crystalline material with a very high degree of hardness.

BRIEF DESCRIPTION OF THE DRAWINGS

Additional objects and advantages of the present invention may be more fully understood by reference to the drawings and the description that follows the drawings.

In the drawing.

BRIEF DESCRIPTION OF THE PREFERRED EMBODIMENTS

Figure 1:
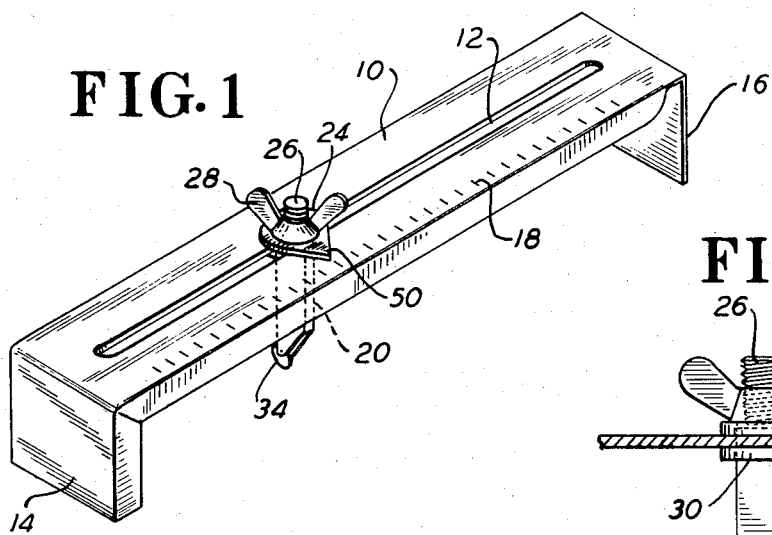
FIG. 1 shows a downward perspective view of one embodiment of the invention.

Turning now to FIG. 1 there shown in perspective view one embodiment of the present invention. A central bridge 10 has a channel or keyway 12 form therein. Outwardly extending support members 14, 16 are formed or rigidly attached to the central bridge member 10. A cutter support member 20 is adapted to be engaged in channel 12. The cutter support member supports a cutter wheel 34 which is rotatable about pin 36 formed in the cutter support member 20.

Figure 3:
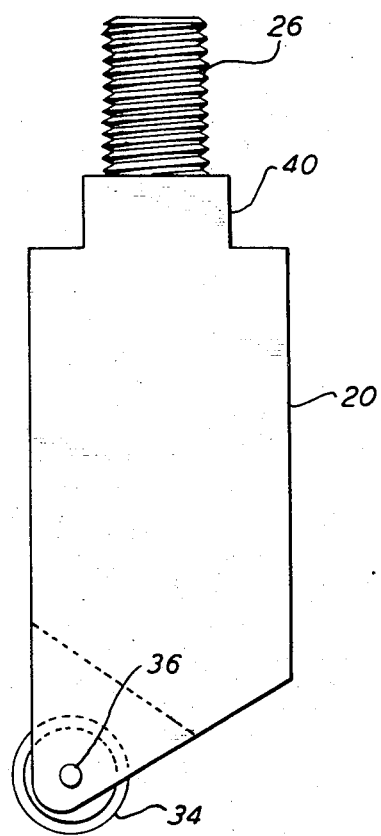
FIG. 3 shows an exploded detail view the cutter support member.

Additional detail of the cutter support member is shown in FIG. 3 there is shown formed on the cutter support member thread 26 to engage a wing nut 28 or any other suitable locking device, and a key shaped surface 40 which is shown as a square key to engage channel 12. It is clear that there can be no rotation of the cutter or cutter support member with respect to the channel 12, and bridge member 10.

Figure 4:
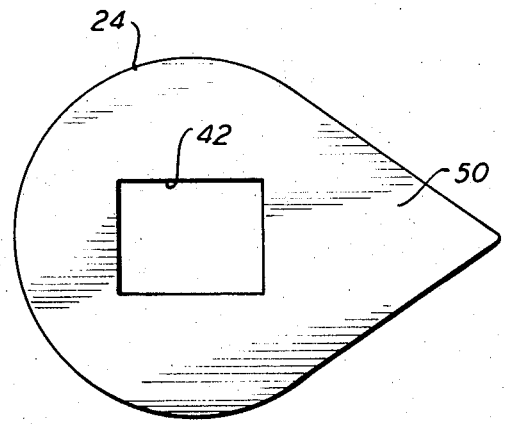
FIG. 4 shows a top view of the pointer washer.

As shown is FIG. 4 a pointer washer 24 has a channel 42 which closely engages key 40. The pointer washer has a pointing portion 50 which indicates on the scale 18 the distance between a side support member 14 or 16.

Figure 2:
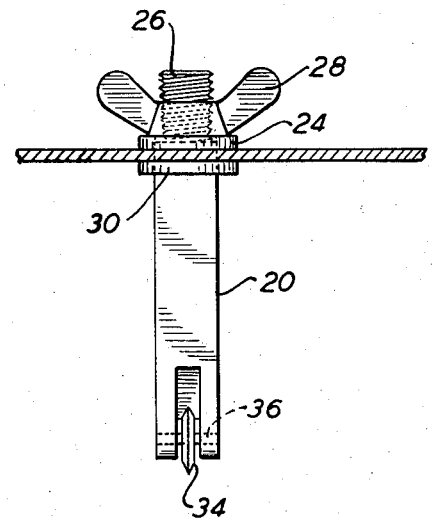
FIG. 2 shows a detail view of the attachment of the cutter support mechanism to the central bridge member and is partially in section.

Additional detail on pointer washer assembly and the matter of engagement between the surface 40 and the channel surface 12, is shown in FIG. 2.

In order for the present invention to work sucessfully only one of the outwardly extending arms 14 or 16 is essential.

The angle formed between outward extending arm 14 and 16 and central bridge member 10 may be more or less 90°. It is essential however, that one of these outward extending members grip the outer surface of the glass to be cut to provide the edge guidance.

It is also important that the cutter surface 34 extend sufficiently far below the plane defined by the support member to put sufficient pressure on the glass to scribe it.

It can be easily seen that the present invention accomplishes all of its stated objectives. It enables the scribing or cutting of glass of indeterminate length because the cutting tool moves along with the edge guidance member.

This capability is only possible because of rigid fastening the cutter support member in the bridge member 10. In turn this support comes from the holding of the cutter member essentially vertically or at 90° angle in respect to the bridge member and from is being held against rotation in either plane in respect to central bridge member.

It is the ability of the present invention to apply sufficient pressure to the sheet of glass to cut it without requiring an extensive and expensive cutter support structure which limits the length of cut to the size of the holding frame which makes the present invention so unique and useful.

This above mentioned ability exists even though glass has the great structural strength both in compression and in shear described earlier.

I claim:

1. An infinitely adjustable glass-scribing device comprising, a frame means including a first leg means attached thereto, said frame means further including a bridge member having at least one longitudinal channel extending over a substantial portion of its longitudinal length, said channel having measuring indicia associated therewith, a scribe means, a holding means for holding said scribe means, said holding means including an integral key means adapted for slideable movement along said channel, said key means having at least two parallel sides, the distance between said parallel sides being slightly less than the width of said channel, thereby preventing rotation of said holding means within said channel, an indicating means for pointing to said indicia, said indicating means being attached to said holding means, and a locking means attached to said key means for selectively locking said holding means at any given position along said channel, wherein force applied to said frame means is substantially fully transmitted to said scribe means through said holding means during the scribing process.

2. The invention of claim 1, wherein said frame means further includes a second leg means extending perpendicularly from said bridge member, each of said leg means including a straight foot section at the end thereof furthest removed from said bridge member, and wherein the edges of said foot sections define a plane through which the tip of said scribe means slightly extends.

3. The invention of claim 2, wherein said locking means includes a threaded shaft attached to said key means, and a threaded nut means for engaging such threaded shaft, wherein said holding means may be selectively locked to said frame means by rotating said nut down such shaft until said nut is secured hand tight.

4. The invention of claim 3, wherein said threaded nut means is a wing nut.

5. The invention of claim 4, wherein the inward surface of one of said leg means forms an edge guide means.

6. The invention of claim 5, when said scribe means is a rotatable cutter wheel attached to the tip of said holding means by a pin means, and further, wherein the plane defined by the rotation of said cutter wheel is substantially parallel to the plane defined by the inside surface of said edge guide means.

* * * * *